Aug. 23, 1955  H. RIOLO  2,716,193
POOR-VISIBILITY SCOPE FOR ROAD VEHICLES
Filed June 9, 1952  3 Sheets-Sheet 1

Inventor:
Hans Riolo
By C. W. Avery
Attorney

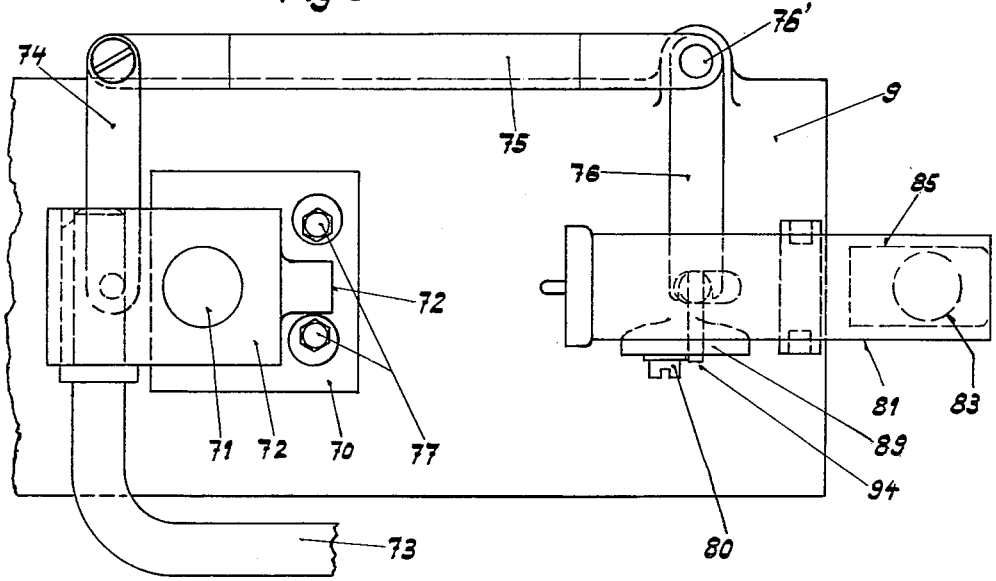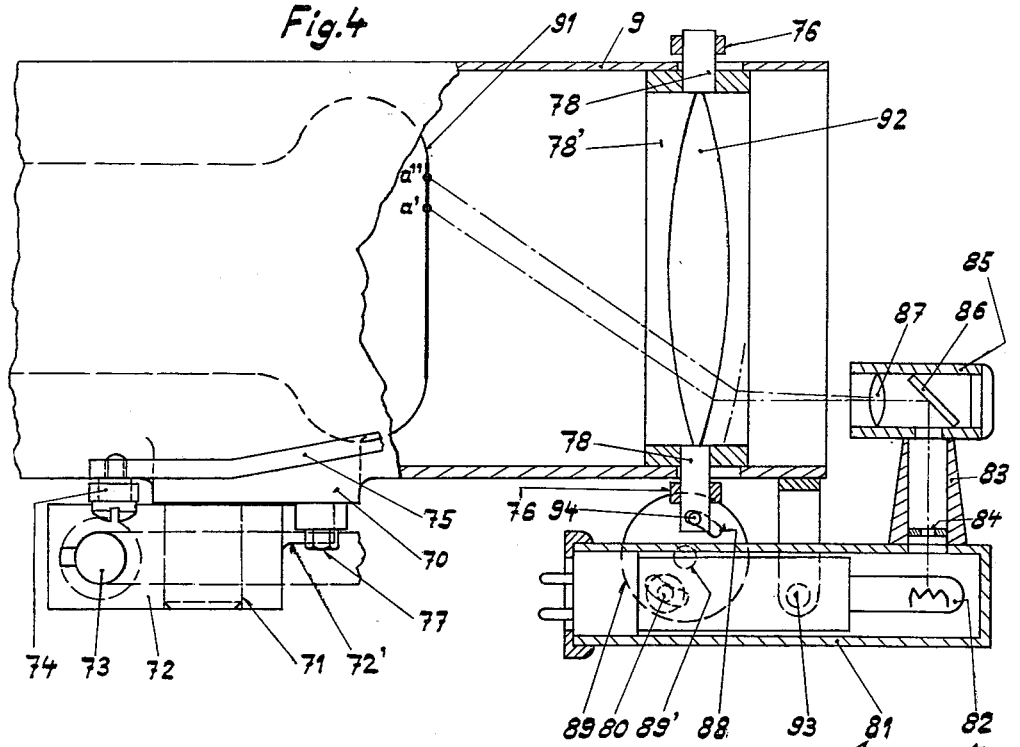

Aug. 23, 1955 H. RIOLO 2,716,193
POOR-VISIBILITY SCOPE FOR ROAD VEHICLES
Filed June 9, 1952 3 Sheets-Sheet 3
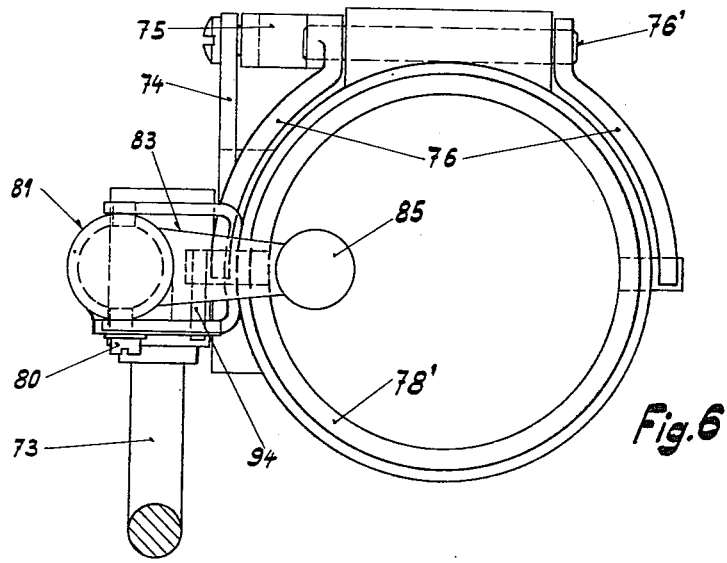
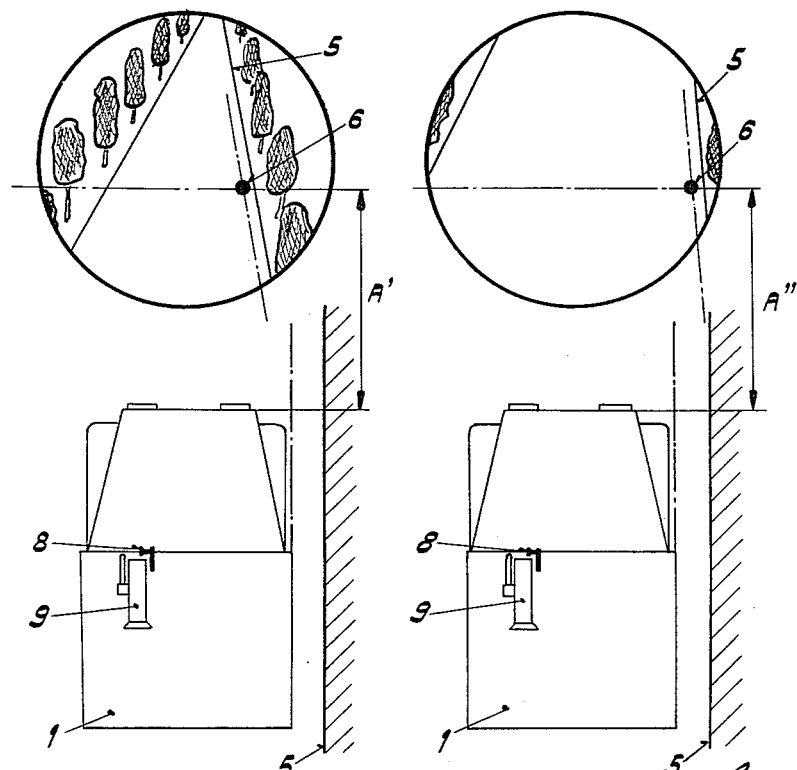

2,716,193

POOR-VISIBILITY SCOPE FOR ROAD VEHICLES

Hans Riolo, Zurich, Switzerland, assignor to Albiswerk Zurich A. G., Zurich, Switzerland, a Swiss corporation Application June 9, 1952, Serial No. 292,454

Claims priority, application Switzerland June 8, 1951

10 Claims. (Cl. 250—215)

My invention relates to a method and means for aiding in the control or steering of road vehicles in complete darkness or poor visibility.

A known apparatus developed for such purposes and suitable for use on a vehicle responds to infrared rays that are issued from a light source on the vehicle and, upon reflection from the road area under observation, are converted by a photoelectric picture converter into a visible image observable by the operator of the vehicle. The light source for such apparatus may consist of the ordinary vehicle head lights which, for this purpose, are equipped with infrared filters permeable to substantially only the long-wave portion of the light spectrum, having wave lengths above about 0.8 micron. The infrared rays reflected from the illuminated area are projected through an objective lens onto the photocathode of a picture converter tube and produce thereon an invisible infrared image of the illuminated area which appears on the fluorescent screen of the tube as a visible image. An ocular lens system, preferably of the binocular type to permit viewing the picture with both eyes, permits the operator to observe a magnified image of the area under observation. The converting apparatus is preferably mounted in front of the driver's seat at the eye level. The driver therefore can readily recognize the details of the road or vehicle lane as well as of the adjacent curb or shoulder strip of the road. (As to further details of infrared converter tubes and their application, see RCA Review, vol. 8, No. 3 (September 1946), pages 385 to 413.)

The picture converter apparatus may be vertically tiltable relative to the vehicle to permit being adjusted for near vision or far vision. The end positions of the vertical adjusting movement are preferably so chosen that the range of view substantially coincides with the illuminated range of the near-beam and far-beam adjustment of the vehicle head lights. To avoid the necessity of manually readjusting the objective of the apparatus when tilting the apparatus from one to the other position, mechanical means are preferably provided which constrainedly adjust the objective lens as a result of the tilting movement of the apparatus so that the visible screen image is focussed to optimum sharpness at least in the two end positions of the tilting range.

While apparatus of the above-described kind are supposed to permit orienting and steering a vehicle at night of poor visibility while driving at the normal speed of travel, actually a considerable amount of skill and experience is still required with the known infrared-responsive devices and the attainable steering accuracy leaves much to be desired. This is due to the fact that the field of vision of the apparatus is necessarily rather limited and that therefore an augmented difficulty is posed by the absence of the normally always present reference means which make the driver consciously or subconsciously aware of the position of some point or structure of the vehicle such as the radiator ornament, a front fender, or a mark mounted on a front fender.

It is therefore an object of my invention to eliminate this deficiency and to permit operating the vehicle with the aid of an infrared picture converting apparatus with the same safety and speed as at good visibility.

To this end and in accordance with a feature of my invention I superimpose upon the road image on the fluorescent screen of the picture converter an image of a fictitious mark which represents the vehicle profile or structure and appears to be located in a fixed relation to the vehicle and at a given distance ahead of the vehicle.

It suffices in most cases to have the mark on the screen represent a given point of the vehicle profile, for instance its right-hand lateral limit at the surface level of the road, and to reproduce this point as a bright dot on the fluorescent screen of the converter tube. With the aid of such a mark, the vehicle can easily be oriented and steered relative to the edge of the driving lane. In other cases, for instance for apparatus on large trucks, it is preferable to produce on the screen a reference image representative of both sides of the vehicle profile, that is a marking which characterizes the width of the vehicle or of the driving lane. If desired the height of the vehicle may be made visible on the screen in a similar manner.

The markings thus produced on the screen may be given various configurations. The marking image, for instance, may consist of one or several dots or dashes partially indicative of the vehicle profile which are distinct by increased brightness from the background picture. Instead of a dot, a circle or two concentric circles may be produced. If desired, the entire vehicle profile may be reproduced on the screen, for instance, by a simplified line contour.

According to another feature of my invention, the apparatus comprises a picture converter apparatus and an optical marking device combined to a single unit. The pertaining marking device contains a light source and an optical system for producing on the screen of the converter tube the image of the above-mentioned fictitious mark.

According to more specific feature of the invention, the optical marking device comprises a diaphragm whose aperture determines the configuration and size of the marking image, and a collector lens system for projecting a parallelized beam of light onto the objective lens of the picture converter device.

The design and arrangement of the above-mentioned devices may be given different modifications within the scope of my invention as will appear from the following.

Especially simple conditions exist when the picture converter apparatus, when in operative position, is immovably secured to the vehicle in a proper location relative to the seat or eye level of the operator. In this case the optical device for producing the reference image may be mounted either on the vehicle body or on the picture converter device itself. It is merely required to permit an adjustment relative to the direction of the beam of light in order to permit placing the marking image into coincidence with the point at which the fictitious reference mark is to appear in front of the vehicle. Especially favorable is an arrangement in which the source of the infrared light rays consist of the head lights of the vehicle. In this case, a small portion of the light from a head light is diverted by mirrors or prisms to the objective lens of the picture converting device to produce the desired marking image. In this manner, the optical device may be limited to a few auxiliary parts.

In cases where the picture converter is vertically tiltable relative to the vehicle for adjustment to near vision or far vision, two possibilities according to my invention are available. The arrangement may either be designed so that the marking image appears invariable in its position relative to the vehicle independently of the tilting position of the picture converter apparatus, or the design may be such that the mark appears to be at a larger distance from the vehicle when the picture converter is set for far vision than when the converter is set for near vision. In the first-mentioned alternative design, the image of a mark of a practically fixed position relative to the vehicle, regardless of the tilting position of the picture converter, appears on the screen only if the direction of the beam of light coming from the optical device and directed onto the objective lens of the picture converter coincides with an imaginary vision line directed onto the fictitious (point shaped) mark. This condition cannot always be fully satisfied with an optical device of fixed position relative to the vehicle body. Preferably therefore the optical device is mounted on the picture converter apparatus in such a manner that the direction of the marking beam thrown onto the objective lens varies in dependence upon the tilting position of the picture converter.

In the second alternative design the arrangement of the optical marking device directly on the picture converter device is especially advantageous because then a tilting of the converter device is accompanied by the desired change in distance at which the mark appears on the fluorescent screen. While the vehicle lane and hence the simulated mark is viewed with a different perspective in each of the two tilt positions of the picture converter, this requires only a lateral (horizontal) correction in the beam direction of the optical device which may be effected with relative simple means.

According to another, more specific feature of my invention a vertically tiltable picture converter joined with an optical marking device, is equipped with a mechanism which automatically changes the position of the optical device relative to the picture converter in dependence upon the tilting of the converter so that in the two end positions of the picture converter the image of the simulated mark appears on the fluorescent screen of the converter in substantially the same position relative to the vehicle at least in the direction transverse to the vehicle travel. Such a device is advantageously applicable with a picture converter which has mechanical means for axially shifting the objective lens to focus the road image to optimum sharpness at least in the near and far vision positions. In such an apparatus the above-mentioned automatic adjustment of the fictitious mark can readily be effected by providing the apparatus with a mechanical transmission that transmits the shifting movement of the objective lens to the optical marking device.

The foregoing and other features of the invention will be apparent from the embodiments exemplified on the drawings and described in the following. In the drawings:

Fig. 4 shows schematically and in section another apparatus according to the invention; this apparatus is vertically tiltable between near-vision and far-vision positions and is combined with the pertaining optical marking device into a single unit;

Fig. 5 is a side view and Fig. 6 is a front view of the apparatus shown in Fig. 4;

Fig. 7 shows a schematic top view of a vehicle equipped with an apparatus according to Fig. 4, and also a schematic image as it may appear to the driver when the apparatus is adjusted to far-vision;

Fig. 8 shows a top view and an image corresponding to Fig. 7, except that the apparatus is adjusted to near-vision.

Figure 1:
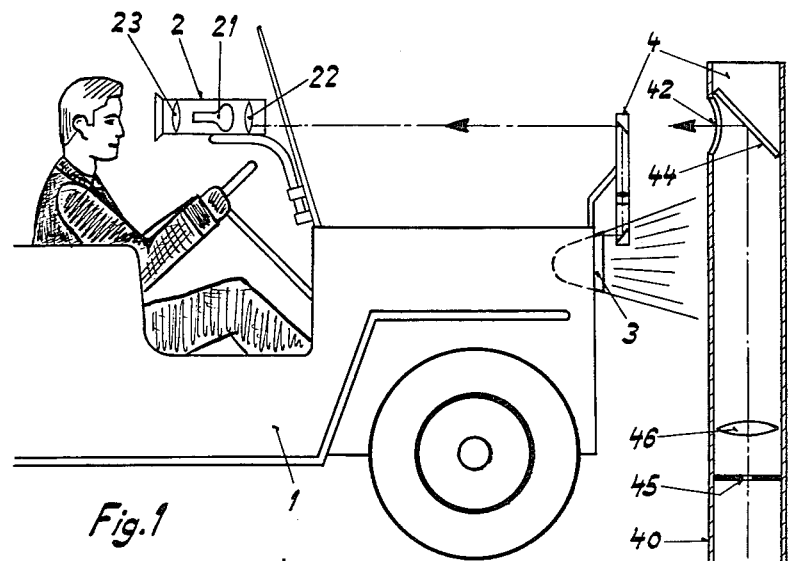
Fig. 1 shows schematically a side view of the front portion of a vehicle equipped with an apparatus according to the invention, the apparatus being firmly secured to the vehicle body so as to retain a fixed position relative thereto when in operation.

According to the embodiment of Fig. 1, an infrared-responsive picture converter device 2 is mounted on the vehicle in a fixed position relative thereto. The picture converter 2 comprises a converter tube 21, an objective lens system 22 and an ocular lens 23. The vehicle head lights 3 serve as infrared radiators and to this end are equipped with the necessary filter sheets. An optical device 4 is mounted immediately in front of one of the head lights 3 in order to divert a portion of the radiation onto the objective lens 22 of the picture converter tube.

Figure 2:
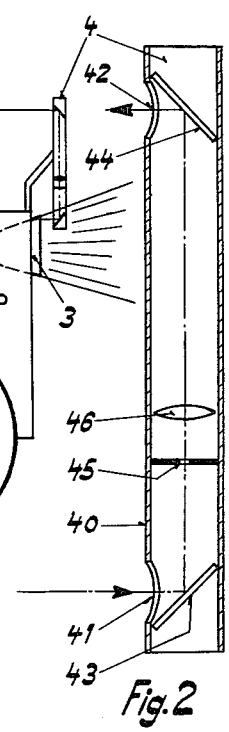
Fig. 2 shows a schematic and sectional view of the main portion of the optical marking device pertaining to the apparatus according to Fig. 1.

The optical device 4, as shown in Fig. 2, comprises a tubular housing 40 with an entrance opening 41 and an exit opening 42. Two mirrors 43 and 44 are disposed in tube 40 at an angle of approximately 45 degrees relative to the tube axis. Disposed in the path of the beam between the two mirrors 43 and 44 is a diaphragm 45 whose aperture is shaped in accordance with the shape of the marking image to be produced on the fluorescent screen of the tube 21. The tube 40 further contains a collector lens system, schematically represented by a single lens 46, for producing a beam of parallel rays.

Figure 3A:
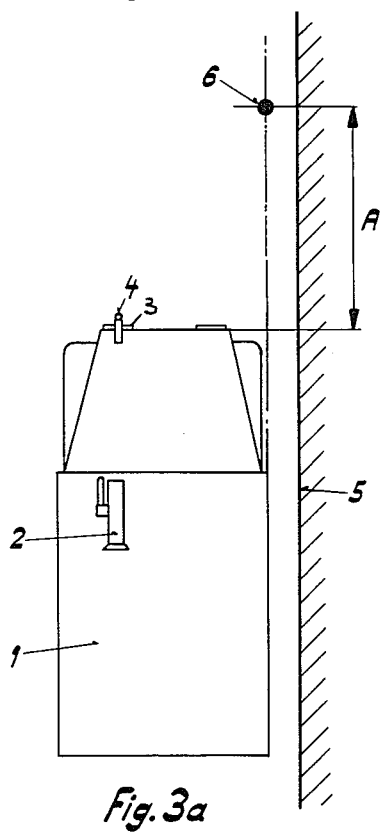
Fig. 3a shows schematically a top view of the vehicle according to Fig. 1 and also exemplifies a fictitious mark as it appears to the driver when using the apparatus.
Figure 3B:
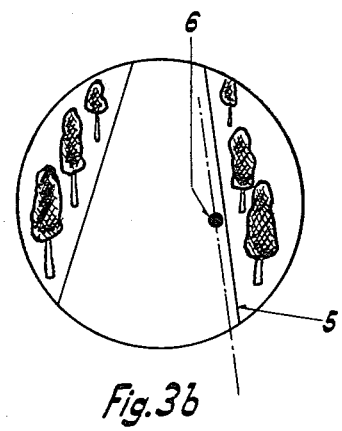
Fig. 3b shows schematically an image as it may be viewed by the driver when using the apparatus.

Assume that, for instance, the right-hand contour of the vehicle profile is to be marked by a dot at a distance A, for instance of 30 feet, ahead of the vehicle and that an image of this fictitious mark is to appear on the fluorescent screen of the picture converter. Then, for adjusting the apparatus, the vehicle may be aligned along the edge or curb 5 of the vehicle lane, and an actual marker 6 may be disposed on the lane in the geometric extension of the right-hand side of the vehicle at the desired distance A. This marker 6, when being viewed through the picture converter, appears at a corresponding point 6 on the screen image as shown in Fig. 3b. Then the optical marking device 4 is so adjusted that the bright dot produced by the optical marking device on the screen coincides with the image of the marker 6. Once this adjustment is made, the marking image produced on the screen simulates a mark which appears to retain the distance A from the vehicle.

A reference mark thus produced on the screen of the picture converter is an essential aid to the driver as it is merely necessary for him to steer the vehicle so that the fictitious marking image is kept at about the same distance from the curb or other road reference. Also the distance of the vehicle from oncoming or preceding vehicles is more readily gauged.

In the apparatus according to Figs. 4 to 6 the optical device 8 for producing the marking image is mounted on a picture converter device that is vertically tiltable relative to the vehicle. Shown in Fig. 4 is a portion of the picture tube 91 and the objective lens system 92 for the converter. The objective lens system 92 is axially displaceable in the tubular housing 9 of the converter in order to produce a sharp image of the road area on the photocathode of the tube in each of the two end positions of the vertical tilting movement corresponding to the adjustment for near vision and far vision respectively. The axial displacement of the objective lens system is dependent upon the tilting motion of the converter. The optical marking device 8 comprises three tubular portions 81, 83 and 85. The portion 81 encloses an electric lamp 82 which serves as a light source. The portion 83 contains a diaphragm 84 in the path of the light beam. The aperture of diaphragm 84 corresponds to the shape and size of the desired marking image. The portion 85 is equipped with mirror 86 inclined at a 45° angle to the direction of the light beam and contains also a collector lens system 87 for producing a beam of parallel rays.

The apparatus has a mounting plate 70 with a horizontal pivot stud 71 which engages the pivot bore of a bearing member 72. Bearing member 72 is stuck upon the vertical, upper end of a bracket rod 73 firmly secured to the vehicle body. The plate 70 and hence the housing 9 of the apparatus are rotatable in a vertical plane about the pin 71. The rotary movement is limited by two adjustable eccentric screws 77 which are abutted by respective stop faces of a lug 72' of the bearing member 72. An arm 74 has one end pivoted to the bearing member 72, while its other end is pivotally connected with a link bar 75. A fork structure has its two arms 76 joined by a shaft 76' with which it is rotatably mounted on the housing 9. The bar 75 is connected with the fork structure and forms together therewith a bell crank lever fulcrumed at shaft 76'. The fork arms 76 have their respective ends in engagement with two coaxial pins 78 firmly secured to the axially displaceable holder 78' of the objective lens 92. In the illustrated position, the tubular housing 9 of the apparatus is set for far-vision. When the housing 9 is being turned to the near-vision setting, that is when the front of housing 9 is being moved downwardly, the angular movement of housing 9 with plate 70 relative to the bearing member 72 is transmitted through the linkage elements 74, 75, 76, 78 to the holder 78' of the lens 92 so that the lens is shifted toward the front opening of housing 9 to keep the image in focus.

The optical marking device 8 as a whole is horizontally rotatable about a pin 93 firmly connected with the housing 9. The device 8 is mechanically connected with the lens system 92 so that the angular position of device 8 relative to the converter housing 9 is automatically varied in dependence upon the tilting movement of the apparatus by a rotary displacement of device 8 about pins 93, so that at least in each of the two end positions of the picture converting apparatus the marking image appears on the screen in the same position relative to the vehicle in the direction across the vehicle travel. For this purpose the above-described shifting movement of the objective lens system 92 is transmitted to the optical device 8 by a guide pin 94 firmly secured to one of the pins 78 of the lens holder 78'. The guide pin 94 engages a slot 88 of a cam disc 89 mounted on the portion 81 of the optical device 8. Disc 89 is rotatably seated on a pin 89' and has an elongated concentric slot traversed by a fastening screw 80 screwed into portion 81. When screw 80 is loosened, disc 89 may be adjusted and thereafter fastened in a selected angular position relative to portion 81. In this manner the end positions of the optical device and hence of the marking image can readily be adjusted. When as shown, the apparatus is adjusted for far-vision, the beam of light from the optical device 8 impinges upon the photocathode of tube 91 at the point $a'$ (Fig. 4). When the apparatus is tilted into position for near-vision, the device 8 turns clockwise about pin 93 relative to housing 9, and the beam of light from the optical device 8 then impinges upon the photocathode of tube 91 at point $a''$.

The position for the marking image in the two respective end positions of the picture converter is apparent from Figs. 7 and 8. Fig. 7 shows the road area visible on the fluorescent screen when the apparatus is set for far vision. The mark, which serves as a reference to the vehicle profile in the same manner as in the above described embodiments of Figs. 1 to 3b, appears to have a given distance A' from the vehicle. When the picture converting apparatus is set for near vision, the area shown in Fig. 8 is visible on the fluorescent screen. Since the optical device 8 is angularly adjusted together with the adjustment of the picture converter, the position of the marking image does not change in the vertical direction. Now, however, the mark appears to be at a shorter distance A" from the vehicle. Due to the constrained positional change of the optical device 8 in the horizontal direction, the marking image is displaced horizontally to the right so that the mark appears to occupy the same position relative to the vehicle in the direction across the lane of travel. This is apparent in Figs. 7 and 8 from the fact that, for one and the same spacing of the vehicle from the curb 5, the marking image 6 on the fluorescent screen appears to have the same distance from the image of the curb 5 regardless of whether the apparatus is set for far vision or near vision.

It will be obvious to those skilled in the art that, as regards design details and the arrangement of the apparatus components, my invention permits various modifications without departure from its essential features and within the scope of the claims annexed hereto.

I claim:

1. The method of visualizing a vehicle position relative to the road at poor visibility, which comprises producing a visible image of a road area by reflected infrared light on the screen of a picture converter, and superimposing on the same screen a marking image of a fictitious reference mark indicative of structure at a given distance ahead of the vehicle.

2. Apparatus for visualizing a vehicle position relative to the road at poor visibility, comprising an infrared-responsive picture converting device mounted on a vehicle and having a screen for reproducing a visible image of a road area, and an optical device mounted on the vehicle and having means for issuing a beam of light and being optically directed onto said converting device, said device having on said screen an optical point of incidence corresponding to a simulated reference at a given distance ahead of the vehicle.

3. Apparatus for visualizing a vehicle position relative to the road at poor visibility, comprising an infrared-responsive picture converting device mounted on a vehicle and having a screen for reproducing a visible image of a road area, and an optical device mounted on the vehicle and having light-beam projecting means directed toward said converting device, said optical device having a diaphragm with an opening disposed in the path of the light beam, and having lens means also disposed in said path for parallelizing said beam so as to produce on said screen a marking image of a simulated reference at a given distance from the vehicle.

4. Apparatus for visualizing a vehicle position relative to the road at poor visibility, comprising an infrared-responsive picture converting device mounted on a vehicle and having objective-lens means and a fluorescent screen tube for producing a visible image of a road area, and an optical marking device mounted on the vehicle and having light-beam projecting means directed onto said objective-lens means, said optical device having a diaphragm with an opening disposed in the path of the light beam, and having collector lens means also disposed in said path for parallelizing said beam to superimpose on said image a reference image indicative of a fictitious mark at a given distance ahead of the vehicle.

5. Apparatus for visualizing a vehicle position relative to the road at poor visibility, comprising an infrared-responsive picture converting device mounted on a vehicle and having a screen for reproducing a visible image of a road area, an optical device having fastening means mounting the optical dvice on the vehicle separate from said converting device, said optical device having a reflector system for issuing a beam of light, and said system being optically directed onto said converting device and having on said screen a point of incidence corresponding to a simulated reference at a given distance ahead of the vehicle.

6. Apparatus for visualizing a vehicle position relative to the road at poor visibility, comprising an infrared-responsive picture converting device mounted on a vehicle and having objective-lens means and a fluorescent screen tube for producing a visible image of a road area, and an optical marking device having mounting means attaching the marking device at the vehicle front, said marking device having a light entrance opening disposed in front of a vehicle headlight when said marking device is attached to the vehicle and having a reflector system for directing a beam of light from the headlight onto said objective-lens means to produce a mark on said screen indicative of a simulated reference at a given distance ahead of the vehicle.

7. In combination, a vehicle having a headlight for illuminating a road area by infrared light, a converting device mounted on the vehicle and having a screen observable by the driver and an objective-lens system directed onto the illuminated road area to cause reflected infrared light to produce an image of the road area on said screen, an optical marking device mounted on the vehicle and having a portion disposed in front of said headlight and a reflector system directed toward said objective-lens means to project thereupon an infrared beam of light from said headlight whereby a reference mark is superimposed upon said image on said screen, and said marking device having a diaphragm disposed in the path of said beam and having a diaphragm opening determining the shape of said reference mark.

8. Apparatus for visualizing a vehicle position relative to the road at poor visibility, comprising an infrared-responsive picture converting device attached to the vehicle and being vertically tiltable between near-vision and far-vision positions respectively, said converting device having a screen for reproducing a visible image of the road area being viewed, and an optical marking device mounted on said converting device to be tiltable together therewith, said marking device having means for issuing a beam of light and being optically directed onto said converting device for superimposing on said screen image a mark simulating a reference at a given distance ahead of the vehicle.

9. Apparatus for visualizing a vehicle position relative to the road at poor visibility, comprising an infrared-responsive picture converting device attached to the vehicle and being vertically tiltable between near-vision and far-vision positions respectively, said converting device having a screen for reproducing a visible image of the road area being viewed, an optical marking device having means for issuing a beam of light and being optically directed onto said converting device for superimposing on said screen image a mark simulating a reference at a given distance ahead of the vehicle, said marking device being mounted on said converting device and being displaceable relative thereto, and mechanical transmission means for displacing said marking device relative to said converting device in dependence upon tilting movement of said converting device for maintaining said mark in said two tilt positions at substantially the same location at least relative to a direction transverse to the vehicle travel.

10. Apparatus for visualizing a vehicle position relative to the road at poor visibility, comprising an infrared-responsive picture converting device attached to the vehicle and being vertically tiltable between near-vision and far-vision positions respectively, said converting device having a screen for reproducing a visible image of the road area being viewed and having an objective-lens system disposed ahead of said screen and axially shiftable in dependence upon tilting movement of said converting device to be focussed for optimum sharpness of the image in either of said two positions, an optical marking device having means for issuing a beam of light and being optically directed onto said converting device for superimposing on said screen image a mark simulating a reference at a given distance ahead of the vehicle, said marking device being mounted on said converting device and being displaceable relative thereto, and transmission means connecting said objective-lens system with said marking device for displacing said marking device relative to said converting device in dependence upon shifting movement of said lens system so as to maintain said mark in said two tilt positions at substantially the same location at least relative to a direction transverse to the vehicle travel.

References Cited in the file of this patent

UNITED STATES PATENTS

| | | |
|---|---|---|
| 1,936,514 | Lengnick | Nov. 21, 1933 |
| 1,969,852 | Markosek | Aug. 14, 1934 |
| 2,183,634 | Zworykin | Dec. 19, 1939 |
| 2,635,193 | Young | Apr. 14, 1953 |